United States Patent Office 3,669,569
Patented June 13, 1972

3,669,569
APPARATUS FOR CONTROLLING THE DELIVERY QUANTITY OF ADJUSTABLE AXIAL PISTON PUMPS
Ludwig Wagenseil, Vohringen, Germany, assignor to Constantin Rauch, Ulm (Danube), Germany
Filed Apr. 24, 1970, Ser. No. 31,563
Claims priority, application Germany, Apr. 25, 1969, P 19 21 298.7; Feb. 2, 1970, P 20 04 577.6
Int. Cl. F04b 1/26
U.S. Cl. 417—222
5 Claims

ABSTRACT OF THE DISCLOSURE

An apparatus for regulating the delivery quantity of adjustable piston pumps, including a control apparatus constituted of a two-chamber slide valve permitting control over the pumps without varying the auxiliary hydraulic fluid pressure. One of the chambers of the slide valve is in communication with a servo valve, and the other chamber in communication with a control circuit regulated by a control device adapted to provide the required regulated delivery conditions for the pumps.

---

Figure 1:
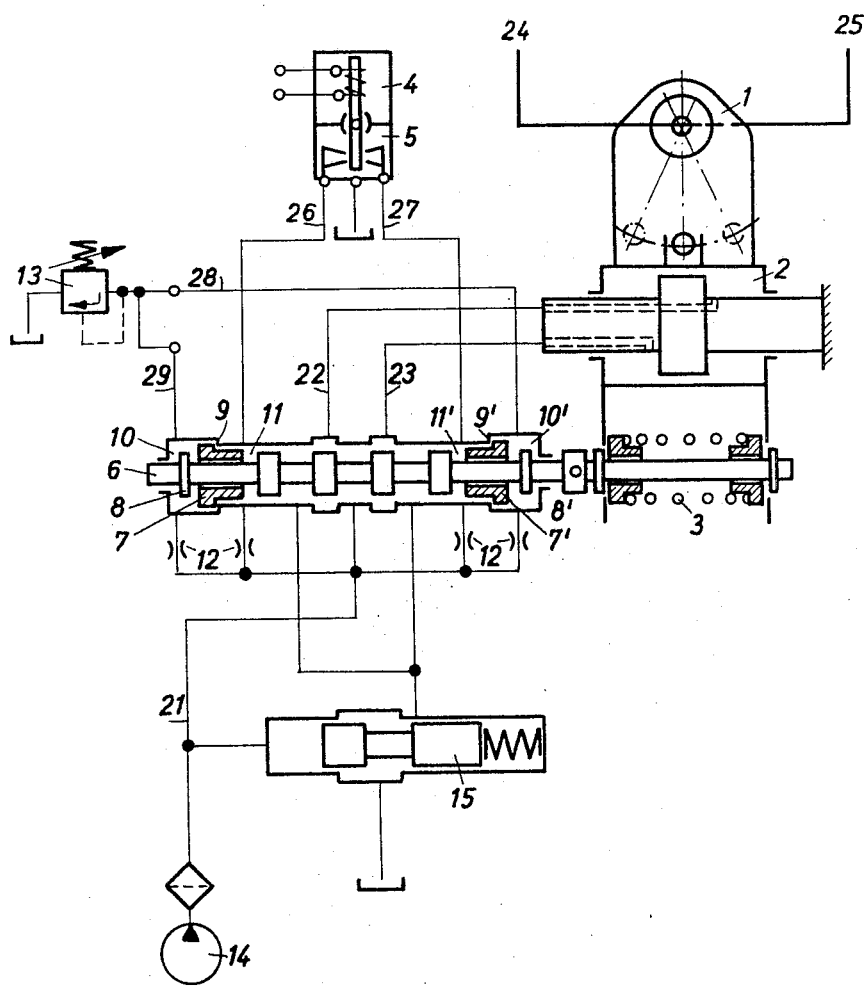

The invention relates to an apparatus for regulating the delivery quantity of adjustable axial piston pumps, the adjustment of which is effected by a servo valve which through the agency of its regulating slide valve controls a servo motor operated by an auxiliary hydraulic circuit.

In the case of known servo valves hitherto it has not been possible for signals fed into the servo valve to be controlled by means of an additional control circuit without influencing the regulating circuit of the servo valve.

Thus, in a known apparatus, the axial piston pump is pivoted by a variable adjusting hydraulic pressure acting on a servo motor. For pressure-dependent control, there is arranged in the adjusting hydraulic line a power limitation valve which is influence by the delivery pressure of the pump and controls the pump to have a constant driving torque. This valve varies the adjusting hydraulic pressure in dependence on the magnitude of the delivery pressure of the pump, and adjusts the latter. This control system varies the adjusting hydraulic pressure itself, so that it is not possible with this arrangement to control a plurality of pumps or machine groups with different powers individually through the agency of a single adjusting hydraulic circuit, since each pump has to be allocated a specific adjusting hydraulic circuit.

An apparatus has also already been proposed wherein the arbitrary adjustment of an axial piston pump is effected by the modified pressure of a hydraulic fluid column and wherein an automatic control of delivery quantity in dependence on working pressure is effected in that in the event of excessive power or pressure the pressure of the adjusting hydraulic column is over-regulated by the pressure of a control circuit. This over-regulation pressure bears by means of an intermediate piston on the adjusting hydraulic column and causes the regulation of the axial piston pump. Owing to this pressure bearing arrangement, comprising mutual influencing of adjusting hydraulic fluid column and control circuit, the apparatus described is not suitable for individual multiple control or regulating systems with the use of a common adjusting hydraulic fluid column, since influencing of all the pumps takes place when the control system for one pump responds. It also involves considerable outlay to construct this apparatus so that it can be used for both directions of delivery.

The present invention has as its object to provide a simple and universally applicable control apparatus which, whilst avoiding the disadvantages discussed hereinbefore, permits control of the pump or pumps without varying the auxiliary hydraulic fluid pressure.

In an apparatus of the type initially mentioned, according to the invention, this is effected in that the control chamber of the regulating slide valve is sub-divided by an annular piston which is displaceable relatively to the regulating slide valve and whose movement is limited on the one hand by an abutment on the regulating slide valve and on the other hand by a collar on the slide valve housing, into two annular chambers which are separate from one another, and that one of the annular chambers is connected to the amplifier stage of the servo valve, whereas the other annular chamber communicates with a control circuit influenced by a control device. One of the two hydraulic circuits, namely the auxiliary hydraulic circuit operating the servo motor, serves in a manner known per se for the arbitrary adjustment of the axial piston pump, the control signals being adapted to be fed-in by way of the input stage of the servo valve in various ways, e.g. electrically, pneumatically, manually, by means of a programme control device. The other hydraulic circuit, the control circuit, is to keep constant, for example, the adjusted power of the axial piston pump, or to limit this to a predetermined value, the delivery quantity of the pump being adapted to its particular working pressure.

This is effected by means of the apparatus proposed according to the present invention in such a manner that the action of the auxiliary hydraulic circuit operating the servo motor is over-regulated by the control circuit with the aid of the slide valve control chamber which is subdivided by an annular piston, without the two circuits influencing one another directly. Thus the delivery quantity of the pump is adjusted without varying the auxiliary hydraulic pressure itself, so that the latter can be available for several pumps simultaneously without influencing of all pumps taking place when the control system for one pump responds. As a result, in arrangements including a plurality of pumps, the considerable costs otherwise required for additional contrtol apparatus are avoided. But even in an arrangement with only one axial piston pump the apparatus according to the invention is advantageous since the original value of the auxiliary hydraulic pressure is maintained during the response of the control system, and after the, for example, overload has ceased, becomes effective again at the level once set.

In an expedient embodiment of the apparatus according to the invention the annular chamber, the volume of which is limited by the abutment of the annular piston on the collar of the slide valve housing, is in communication with the control circuit, and the pressure in the control circuit is greater than the pressure in the annular chamber connected to the amplifier stage of the servo valve, the control system being effective as soon as the pressure prevailing in the first-mentioned annular chamber falls below the pressure prevailing in the other annular chamber. This means that the annular chamber whose volume is limited by the abutment of the annular piston on the regulating slide valve is connected to the amplifier stage of the servo valve. The advantage of a control operation in the form of a pressure decrease is that both in the case of an unforseen drop in pressure in the control circuit and in the auxiliary hydraulic circuit the pump or pumps is/are always adjusted in the sense of a smaller delivery quantity.

In order to make the apparatus according to the invention suitable for reversing regulating systems also, the regulating slide valve is allocated control chambers subdivided into two annular chambers by annular pistons for each delivery direction.

According to the invention, the control device in the control circuit is a valve which is adapted to be controlled selectively mechanically, hydraulically, pneumatically, thermostatically or electrically in dependence on a parameter.

The aforesaid parameter can be, for example, the differential pressure of the working conduits of the pump or the differential pressure taken through the agency of a throttle in one of the working conduits of the pump.

Further features according to the invention will become apparent from the following description of the form of embodiment illustrated in the accompanying drawings, and the claims.

Figure 2:
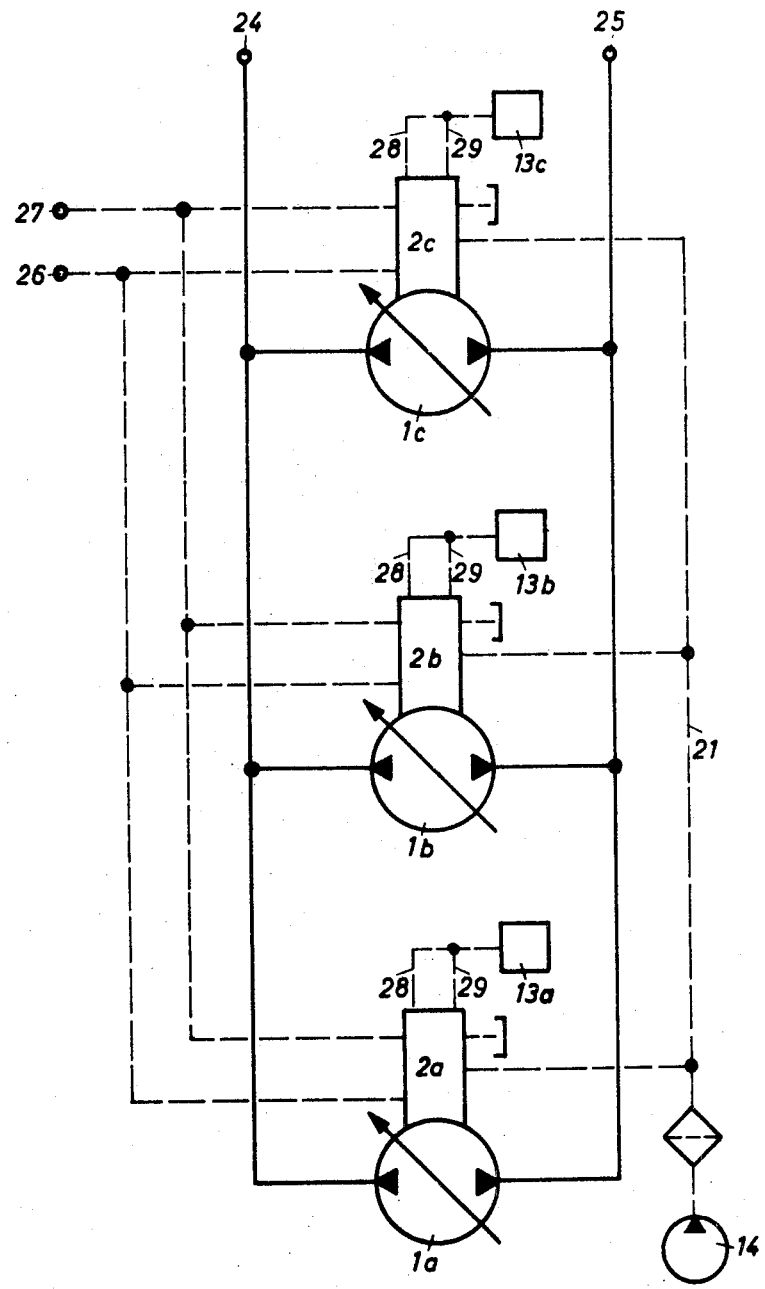

In the accompanying drawings:

FIG. 1 shows diagrammatically one example of embodiment of the apparatus according to the invention, and FIG. 2 shows diagrammatically an example of an application using a multiple control system.

The adjustment of the pump 1 is effected by the servo motor 2 which is activated with an auxiliary hydraulic circuit supplied by the auxiliary pump 14 through the agency of the conduits 21, 22 and 23. The connecting-in or cutting-out of the auxiliary hydraulic circuit is effected by the regulating pistons of the regulating slide valve 6 which carries the annular pistons 7 and 7' according to the invention in displaceable manner, these pistons separating the control chambers into an inner annular chamber 11 or 11' respectively and an outer annular chamber 10 or 10' respectively. The inner annular chambers 11, 11' are connected by conduits 26, 27 to the amplifier stage 5 of a servo valve whose input stage is designated as 4. The outer annular chambers 10, 10' are connected by way of the conduits 28, 29 to a control circuit containing the control valve 13. From the conduit 21, oil branched off from the auxiliary hydraulic circuit flows through constant throttles 12 into all annular chambers so that pressures can build up therein the magnitude of which in the inner annular chambers 11, 11' depends on the arbitrary signals which are fed into the input stage 4 of the servo valve and convert it in the amplifier stage 5, whereas in the outer annular chambers 10, 10' it is determined by values which are put into the control circuit 13, 28, 29. This can be effected in various ways, for example in dependence on the working pressure of the pump 1 in the conduit 24, 25. Of course the arrangement may also be such that the function of the inner annular chambers 11, 11' is interchanged with the function of the outer annular chambers 10, 10'.

The apparatus is so designed that first of all in the outer annular chambers 10, 10' a pressure prevails which is greater than the pressure in the annular chambers 11, 11' connected to the amplifier stage 5 of the servo valve. This pushes the annular pistons 7, 7' against the relatively low pressure prevailing in the inner annular chambers 11, 11' as far as a collar 9, 9' respectively in the slide valve housing, in the inward direction. In the illustrated central position of the pump 1, the slide valve 6 is held by the preloaded spring 3, the symmetrically arranged annular chambers 11, 11' being each acted upon with the same pressure. The same applies to the annular chambers 10, 10'. If, in order to adjust the pump 1 arbitrarily, a signal is put into the input stage 4 of the servo valve, by means of the amplifier stage 5 the pressures in the inner annular chambers 11, 11' are so modified that in one of the two chambers a greater pressure prevails than in the other, whereby the regulating slide valve 6 is moved in opposition to the force of the spring 3, so that the auxiliary hydraulic circuit 21/23 is connected to the servo motor 2, which adjusts the pump 1. This adjusting operation continues until the force of the spring 3 is in equilibrium with the force acting on the regulating slide valve 6 (regulating pressure×annular surface), so that the regulating slide valve 6 again separates the auxiliary hydraulic circuit from the servo motor 2.

The delivery quantity of the pump 1 is controlled by means of the control circuit 28, 29 with control valve 13 e.g. in order to keep constant or limit the power of the pump. According to the further proposal provided here the data which are to be preset for the pump and kept constant or limited are also fed in from a remote location by the control valve 13. This control circuit converts the control signals fed into it through the control valve 13 into hydraulic pressures which act on the outer annular chambers 10, 10'. The signals fed into the control valve 13 can be of various kinds e.g. mechanical, thermostatic, dependent on the operating pressure of the pump 1, electrical, and act in various ways e.g. continuously or by switching the control circuit on and off.

As soon as the pressure in the outer annular chambers 10, 10' produced by the control circuit drops below the higher pressures prevailing in the inner annular chambers 11, 11', the relevant annular piston 7, 7' is pressed against the abutment 8 or 8' respectively on the slide valve 6, so that the force of the spring 3 acts against the now decisive smaller force which is brought about by the reduced pressure prevailing in the outer annular chambers 10, 10', and thus displaces the regulating slide valve 6 oppositely to the previously adjusted position. As a result the pump 1 is swung back through the agency of the auxiliary hydraulic circuit 21, 23 and servo motor 2 until the forces emanating from the spring 10, 10' are again in equilibrium and the regulating slide valve 6 returns to its middle position.

The arbitrarily selected auxiliary hydraulic pressure prevailing in the inner annular chamber 11, 11' and the regulating circuit of the servo valve remains unaltered in this over-regulation operation.

Owing to the restoring forces of the pump 1 the adjusting cylinder or piston is subjected to further forces, partly in the pivoting direction, partly oppositely to it. In order to compensate for the reaction of such forces on the auxiliary hydraulic pressure, the control pressure valve 15 is provided.

FIG. 2 shows diagrammatically an arrangement wherein a plurality of pumps 1a, 1b, 1c are connected to the inlet and outlet conduits 24 and 25, whose servo motors 2a, 2b, 2c are actuated through the agency of a common auxiliary hydraulic circuit 21 supplied by the pump 14. Although all the pumps communicate through the conduits 26, 27 with only one servo valve or its amplifier stage, each pump 1a, 1b, 1c can be independently controlled through a control circuit which is associated therewith and comprises the supply conduits 28, 29 and a control valve 13a, 13b, 13c, and the type and characteristic of the individual control circuits can differ from one another.

The control device which is constructed in the form of a valve 13 adapted to be controlled by a parameter and whose control range can be remote-present selectively, can be a power regulator with hydraulic pressure separation.

The valve 13 can also be pre-adjustable by electro-hydraulic means.

I claim:

1. Apparatus for the control of the delivery quantity of adjustable axial piston pumps, comprising at least one axial piston pump, servo motor means connected to said pump for adjustment thereof; auxiliary hydraulic pump means actuating said servo motor means; a servo valve including conduit means interconnecting said auxiliary hydraulic pump means and said servo motor means for controlling the latter; a regulating slide valve interposed in said conduit means; and a control circuit including a control valve means connected to said regulating slide valve; said regulating slide valve comprising a closed housing, axially slidable piston means arranged within said housing and dividing the latter into first and second closed chambers, conduit means interconnecting the first of said chambers with said servo valve, conduit means interconnecting the second of said chambers with said control valve means, an abutment member fastened to said piston means and a collar provided on said housing limiting axial movement of said piston means within said slide valve, the volume of said second chamber being dependent upon the piston means in said slide valve abutting against the collar on said housing, said second chamber being in communication with said control circuit when the pressure in the latter is in excess of the pressure in the first chamber connected to the servo valve, said servo motor effecting controlling adjustment of said pump upon the pressure in said second chamber falling below the pressure in said first chamber, said control valve means adapted to be selectively controlled in dependence upon predetermined operating parameters.

2. Apparatus as claimed in claim 1, comprising reversing control means for sliding movement of said piston means within said slide valve, said reversing control means including a pair of spaced piston means in said housing, said piston means dividing said first and second chambers into paired control chambers.

3. Apparatus as claimed in claim 1, comprising a plurality of said axial piston pumps; a plurality of said servo motors being associated one each with each of said pumps; said auxiliary hydraulic pump means and said servo valve being connected in common with each of said servo motors; and a separate one of said control circuits and control valve means being provided for each of said pumps.

4. Apparatus as claimed in claim 1, wherein said control valve means comprises a pressure regulating valve responsive to movement of said piston means within said regulating slide valve.

5. Apparatus as claimed in claim 4, including restrictive orifice means limiting the rate of flow of hydraulic fluid for said auxiliary hydraulic pump means to said regulating slide valve, and said control valve means being adapted to vary the pressure in said second chamber for controlling the discharge of hydraulic fluid from said slide valve.

References Cited
UNITED STATES PATENTS

| | | | |
|---|---|---|---|
| 2,157,240 | 5/1939 | Keel | 91—461 |
| 2,255,783 | 9/1941 | Keindrick | 91—461 |
| 2,622,393 | 12/1952 | Edwards et al. | 91—461 |
| 3,213,763 | 10/1965 | Pearson et al. | 91—388 |
| 3,327,475 | 7/1967 | Clark et al. | 417—222 |
| 3,386,457 | 6/1968 | Adams | 91—461 |
| 3,429,225 | 2/1969 | Keyworth | 91—506 |
| 3,488,029 | 1/1970 | Durbin | 91—461 |

FOREIGN PATENTS

| | | | |
|---|---|---|---|
| 1,185,553 | 8/1959 | France | 91—367 |
| 550,159 | 10/1956 | Italy | 417—418 |

WILLIAM L. FREEH, Primary Examiner

U.S. Cl. X.R.

417—216